May 1, 1928.
A. T. PALMER
1,668,169
HOLDING DEVICE FOR RAILROAD FROGS
Filed July 21 1926
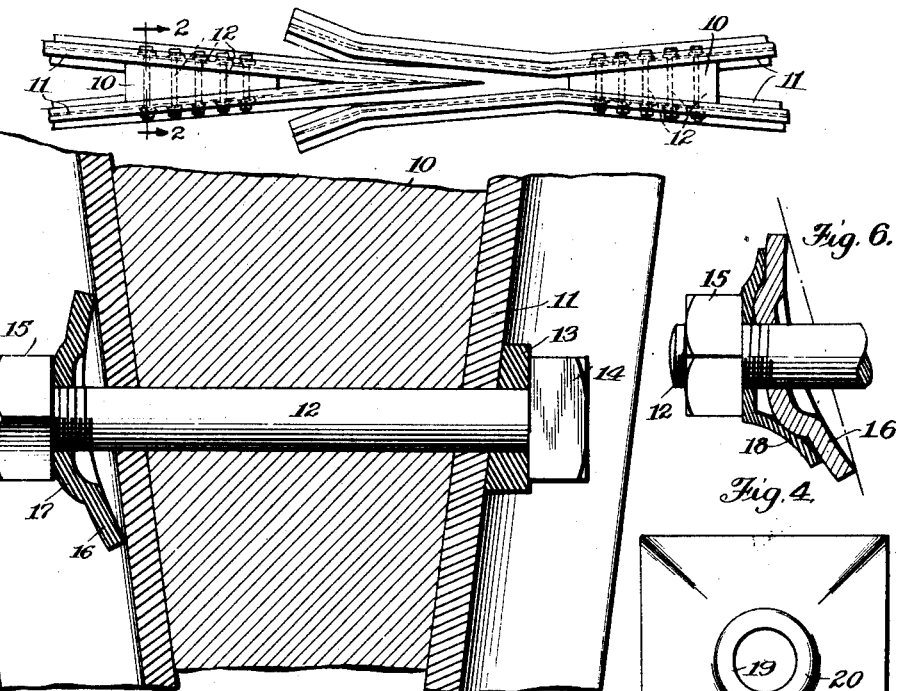
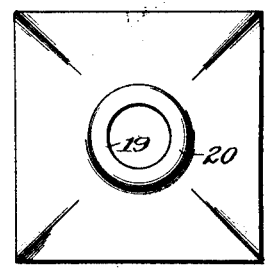
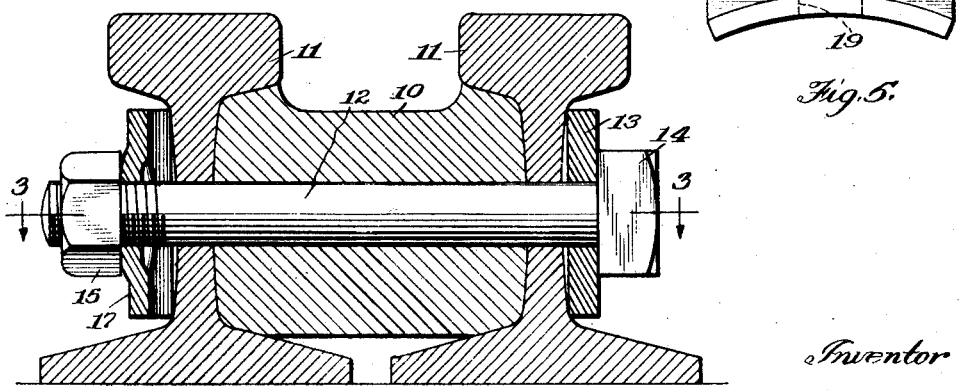
Inventor
By Alphonso T. Palmer
Nissen & Crane
Attys.

Patented May 1, 1928.

1,668,169

UNITED STATES PATENT OFFICE.

ALPHONSO T. PALMER, OF CHICAGO, ILLINOIS.

HOLDING DEVICE FOR RAILROAD FROGS.

Application filed July 21, 1926. Serial No. 123,840.

This invention relates to means for securing together parts of railroad frogs and has for one of its objects the provision of such securing means which shall continuously exert a strong force tending to draw the parts together, which shall compensate for the angularity of the parts connected, and which shall render unnecessary the use of nut locks or other holding devices for preventing the holding nuts from loosening.

Other objects and advantages of the invention will appear from the following description.

The invention is exemplified in the combination and arrangement of parts shown in the accompanying drawing and described in the following specification, and it is more particularly pointed out in the appended claims.

In the drawings—

Fig. 1 is a top plan view of a railway frog having the present invention applied thereto;

Fig. 2 is a vertical section on line 2—2 of Fig. 1;

Fig. 3 is a horizontal section on line 3—3 of Fig. 2;

Fig. 4 is an elevation and Fig. 5 a plan of a modified form of holding device; and Fig. 6 is a fragmentary section similar to a portion of Fig. 3, but showing an additional appliance.

In railway frogs used in switches and crossings where two rails come together at an angle it is customary to provide a block indicated at 10 in the drawing to which the rails 11 are secured by bolts 12. Since the rails are disposed at an angle to each other it is apparent that the heads and nuts of the bolts 12 would not fit squarely against the rail flanges if they were permitted to bear directly against the flanges. To overcome this difficulty the present invention provides a plurality of wedge-shaped blocks 13 disposed beneath the heads 14 of the bolts 12. Beneath the nuts 15 spring plates 16 are arranged, the plates being perforated to receive the bolts 12. The plates are made of heavy spring steel so that several thousand pounds pressure may be exerted by the nuts 15. As shown in the drawing, the plates are curved outwardly so that when the nuts are tightened the plates are placed under heavy spring stress. It has been found in practice that where the plates are made sufficiently strong to withstand the force of the nuts 15 without being completely flattened against the webs of the rails, the spring force of the plates will produce sufficient friction between the nut and plate and between the threads of the nut and bolt to prevent the nuts from loosening even under the severest conditions of vibration to which frogs are subjected. In practice it has been found that a force of approximately twenty-five thousand pounds on each bolt gives satisfactory results and that where the springs are made sufficiently strong to withstand this force the bolts will remain in place indefinitely without loosening of the nuts. The amount of force exerted on the bolts 12 may, of course, vary through large ranges of values and it has been found that a force as small as ten thousand pounds on each bolt will suffice to hold the nuts from becoming loose. This arrangement automatically insures continuously tight connection between the rails and frogs so that there is no relative movement and wear is thus avoided, greatly increasing the life of the frog.

In order to compensate for the angularity of the bolt relative to the face of the rail the spring plate 16 is struck outwardly to provide a boss 17, the outer face of the boss being normal to the axis of the bolt 12. This face may be arranged at different angles in different spring plates to provide plates for rails that meet at various angles. However, the great majority of frogs have the same angle so that a single style of spring plate will serve for most installations. Sometimes it is convenient to supply beveled washers similar to that shown at 18 in Fig. 6. These washers are arranged to fit over the bosses 17 on the spring plate 16 and may be provided with different bevels to provide the proper angularity for different frogs. Not only does the spring plate arrangement provide a more efficient frog construction than has heretofore been possible, but it avoids the necessity of angle blocks beneath the nuts and the use of spring washers and nut locks. The installation is much cheaper than that heretofore used as well as adding to the efficiency and life of the frog.

In Figs. 4 and 5 there is shown a spring plate suitable for use in crossings where the rails intersect at right angles and are secured to blocks having faces normal to the connecting bolts. As seen in the drawing, these plates are bowed in two directions so that all four edges of the plate are arc-shaped, as indicated at 19. A boss 20 may be struck up from the convex side of the plate to provide a seat for the nut.

I claim:—

1. The combination with railway rails disposed at an oblique angle to each other, of a tapered block interposed between said rails, a bolt passing through said rails and block, a nut on said bolt, and a curved spring plate disposed beneath said nut and having a contact face normal to the axis of said bolt.

2. The combination with a bolt, of a member through which said bolt extends, said bolt projecting at an oblique angle from the surface of said member, a nut on the projecting end of said bolt, and a spring plate disposed beneath said nut, said spring plate having a boss on the outer surface thereof providing a contact face for said nut normal to the axis of said bolt.

3. The combination with a pair of railway rails disposed at an oblique angle to each other, of a block interposed between said rails, a bolt passing through said rails and block, a nut on said bolt, and a curved spring plate beneath said nut and having a perforation therein through which said bolt extends, said plate having a boss on the outer face thereof providing a contact face for said nut normal to the axis of said bolt, the concave face of said plate being disposed adjacent one of said rails.

4. The combination with a pair of railway rails disposed at an oblique angle to each other, of a bolt extending through said rails, a spring plate having an opening therethrough and disposed over said bolt, and a tapered washer engaging said spring plate to provide a contact face substantially normal to the axis of said bolt.

5. In combination, a bolt, a member through which said bolt extends, the face of said member being disposed at an oblique angle to the axis of said bolt, a curved spring plate having an opening therethrough for receiving the projecting end of said bolt and having a boss on the outer face thereof, and a washer shaped to fit over said boss and graded in thickness to provide a contact outer face substantially normal to the axis of said bolt.

6. A railway frog comprising rails meeting at an oblique angle, a wedge-shaped block interposed between said rails, a plurality of bolts extending through said rails and block, wedge-shaped washers disposed beneath the heads of said bolts, curved spring plates having openings therethrough for receiving the projecting ends of said bolts, said plates having their concave faces engaging the face of one of said rails and having bosses projecting from the convex faces thereof, the outer faces of said bosses being disposed at an angle to the face of said rail engaged by the concave sides of said plates, and nuts on said bolts engaging the outer faces of said spring plates.

7. The combination with a pair of railway rails disposed at an oblique angle to each other, of a bolt for securing said rails together, the axis of said bolt being arranged at an oblique angle to the faces of said rails, an arc-shaped spring plate having an opening therethrough for receiving the projecting end of said bolt, said plate being arranged to engage said rail at horizontally opposite sides of said bolt, the convex side of said plate being disposed away from said rail and having a boss thereon providing a contact face, and a nut threaded on said bolt and engaging the contact face, said contact face being substantially normal to the axis of said bolt.

8. A rail spring for rail installations including non-parallel rails, comprising a longitudinally curved body portion having an opening through the crown thereof.

9. A rail spring for rail installations including non-parallel rails, comprising a longitudinally and transversely curved body portion having an opening through the crown thereof.

In testimony whereof I have signed my name to this specification on this 19th day of July, A. D. 1926.

ALPHONSO T. PALMER.